(No Model.) 2 Sheets—Sheet 2.
C. H. BATES.
CONDUIT FOR ELECTRIC OR CABLE ROADS.
No. 468,314. Patented Feb. 2, 1892.
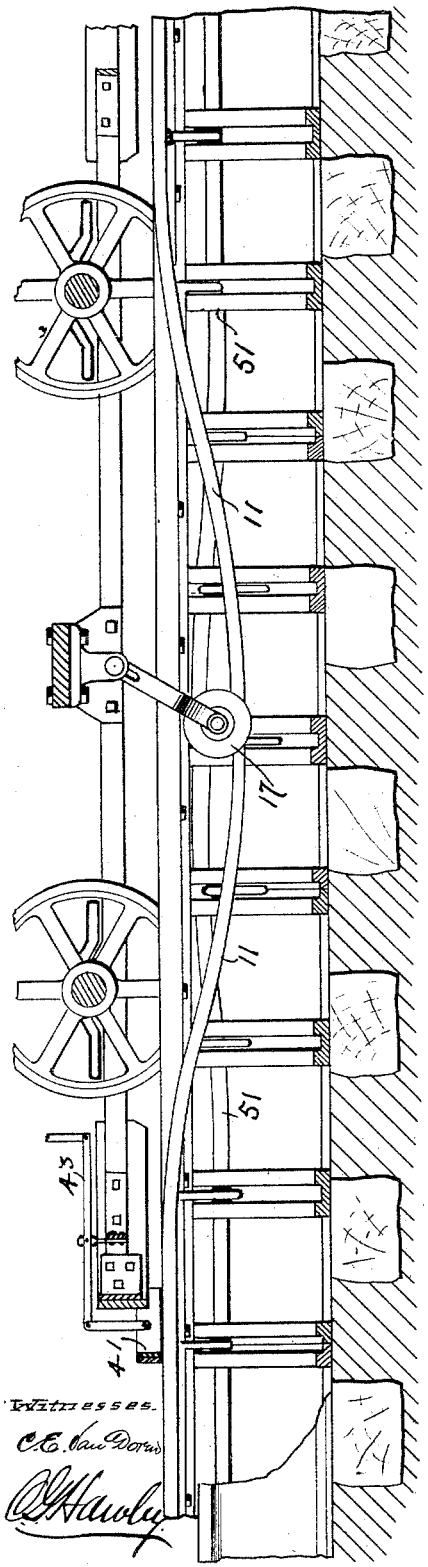
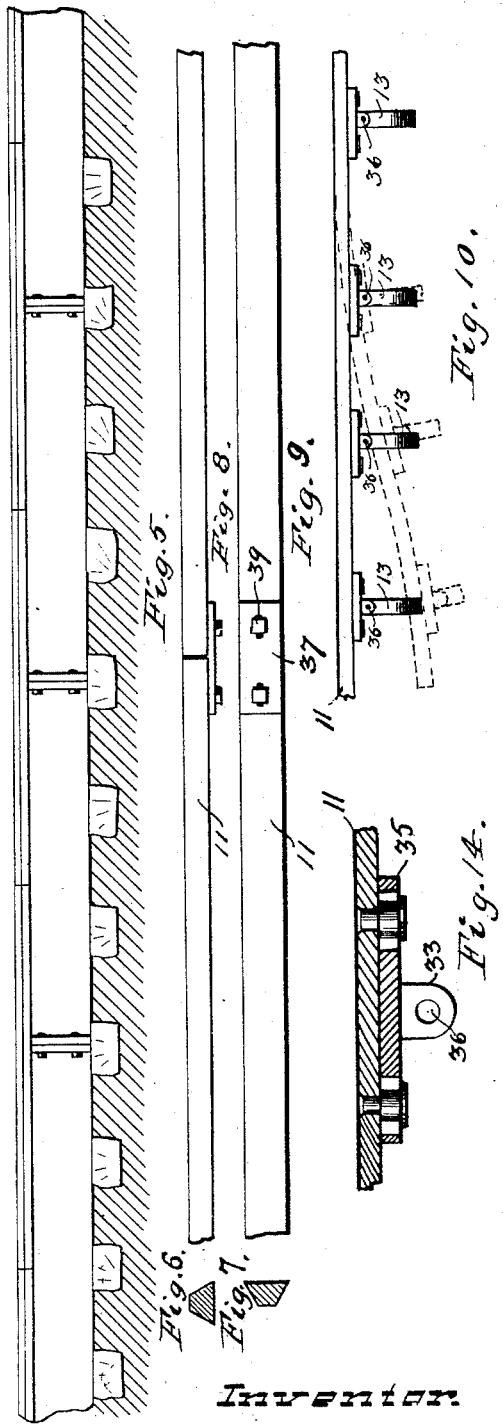
Witnesses
Inventor
Clarence H. Bates.
By Paul ———— Attys

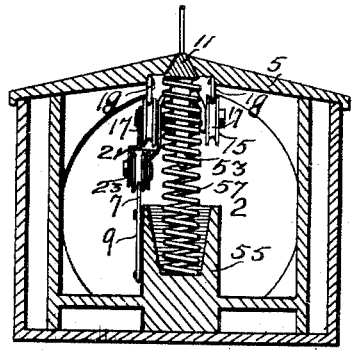

UNITED STATES PATENT OFFICE

CLARENCE H. BATES, OF MINNEAPOLIS, MINNESOTA.

CONDUIT FOR ELECTRIC OR CABLE ROADS.

SPECIFICATION forming part of Letters Patent No. 468,314, dated February 2, 1892.

Application filed January 26, 1891. Serial No. 379,013. (No model.)

*To all whom it may concern:*

Be it known that I, CLARENCE H. BATES, of Minneapolis, in the county of Hennepin and State of Minnesota, have invented certain new and useful Conduits for Electric or Cable Roads, of which the following is a specification.

My invention relates to improvements in conduits for electric or cable roads; and the object I have in view is to provide a conduit with means for automatically closing the slot in the conduit through which the trolley or grip bar passes into the conduit, and with means on the car for uncovering the slot as the car passes along.

In the accompanying drawings, forming part of this specification, Figure 1 is a transverse section showing the trolley in the conduit and the conduit-slot uncovered. Fig. 2 is a similar view showing the slot closed and the trolley farther along in the conduit. Fig. 3 is a detail showing the trolley with brushes arranged on the trolley-wheel. Fig. 4 is a longitudinal section of a portion of the conduit, showing a portion of a car and the means for opening the slot. Fig. 5 is a side elevation of the conduit. Figs. 6, 7, 8, and 9 are details of the closing-strip. Fig. 10 is a detail view of the preferred means for supporting the closing-strip. Figs. 11, 12, 13, and 14 are details of modifications.

In the drawings, 2 represents the conduit, which may be of any preferred construction. It is provided at the top with the closing-plates 5, between which is a slot through which the trolley-arm or the grip-arm passes.

The conduit may contain a cable or electric conductors. I have here shown an electric conductor 7, arranged upon suitable brackets or supports 9, that are secured in any convenient manner within the conduit.

A flexible strip 11 is arranged within the conduit and is adapted to close the slot at the top of the conduit. This strip is preferably narrower at the top than at the bottom, so as to fit into the slot without passing through it and so as to be capable of being depressed and moved out of the slot. The strip 11 is supported by a series of weighted arms 13, that are pivoted on suitable supports in the conduits and are connected to the under side of the strip. These arms tend to hold the strip in position in the slot, while permitting it to be depressed as the trolley or grip arm passes along in the slot. For the purpose of depressing the strip I prefer to provide a carriage or truck 15, that is secured to and moves with the grip or trolley arm. This truck is preferably provided with the wheels 17, that run upon suitable rails 18, that are suitably supported at opposite sides of the conduit-slot, being secured in any suitable manner either to the under side of the top of the conduit or to any other suitable support. This truck or carriage is provided with a central roll 19, having preferably beveled flanges, and the truck rides upon the top of the flexible strip 11. The strip is thereby depressed, being held up against the under side of the roll 19 by the weighted arms hereinbefore referred to. As the truck passes along in the conduit the strip 11 is depressed, uncovering the slot, and then closing automatically after the truck has passed. This truck also carries the means for engaging the cable or a conductor for engaging the electric wire. I have shown a suitable arm 21, that is secured to this truck and carries a trolley-wheel 23 that bears upon the conductor. In some instances the conductor may be protected by the inclined plates 25, arranged over it, and the trolley-wheel may have brushes 27 secured to it, as shown in Fig. 3, for the purpose of removing the dust from the plates 25 as the trolley passes along over the conductor. The arms 13 may be connected to the flexible strip 11 in any suitable manner. In Figs. 1 and 2 I have shown this strip provided with staples or eyes 29 and the ends of the arms 13 in the form of hooks engaging said staples. In Figs. 10 and 14 I have shown plates 35, riveted or otherwise secured to the under side of the strip 11 and provided with depending lugs 33. The ends of the arms 13 project between these lugs, and a pivot 36 extends through the lugs and through the end of the arms, forming a pivotal connection therein. This permits of a pivotal play between the strip and the arms as a portion of the strip is depressed by the truck, as indicated by dotted lines in Fig. 10. The connection between the strip and the plates is made by means of rivets or other equivalent device extending through slotted openings in the plate, thereby permitting a slight movement of the strip as it expands and contracts. The strip, if it is found necessary to make a joint therein, may be connected by means of the plate 37 and bolts 39, extending through slotted openings in the plate 37, as shown in Figs. 8 and 9, permitting an expansion and contraction of the strip. It will be noted that by this means I provide an automatic closing device for the slot in the conduit, which may be depressed as the cars pass along and which will immediately close thereafter and will exclude all dust, dirt, snow, and water from the conduit. Suitable provision may be made, however, for taking off water from the conduit should any collect therein. I also prefer to provide in connection with the car that is used with this device an adjustable plow 41, that is secured upon the car and provided with a lever 43, by which it may be raised and lowered and adapted to come directly over the slot in the conduit, so that as the car passes along any snow that accumulates over the top of the conduit will be removed. For the purpose of weighting the arms 13, I may provide a flexible rod 51, that is secured upon the rear ends of the arms and by which the rear ends will be depressed for the purpose of holding the strip in position to close the slot.

While I have shown and described weighted arms for holding the flexible strip in its position, it is obvious that other means—such as suitable spring-controlled devices—may be used in place of the weighted arms, and in the detail, Figs. 11 and 12, I have shown the flexible strip 11 secured upon the ends of rods 53, that are held in position in suitable projections or brackets 55 and are supported by means of the spiral springs 57. By this means it will be seen that the flexible strip 11 will be held in position to close the slot in the conduit. Any suitable spring might be used for holding the flexible strip in position while permitting it to yield for the purpose of opening the slot, and any suitable means may be used for depressing the flexible strip, and in Fig. 11 I have shown a wheel 59, that may be supported upon the car by a yoke 61 and that is provided with a central flange 63, that is adapted to project into the slot in the conduit and depress the flexible strip. The circumference of this wheel upon each side of the central flange is preferably recessed, so as to fit closely upon the upper surface of the conduit. In Fig. 12 I have shown the electrical conductor supported upon the projecting brackets 55.

I do not wish to be limited to any particular means for supporting the electrical conductor, nor do I wish to be limited to the application of this invention to an underground conduit.

I claim as my invention—

1. The combination, with a suitable conduit adapted to contain a cable or an electric conductor and provided with a longitudinal slot or opening adapted to permit a grip or trolley arm to enter the conduit and engage said cable or electric conductor, of a flexible closing-strip and yielding supporting devices arranged to hold said strip in said slot and permitting it to be moved downward and out of the slot and into the conduit as the grip or trolley arm passes along the slot.

2. The combination, with the slotted conduit, of a continuous flexible strip adapted to close the slot in the conduit, and the series of yielding supports engaging said strip and holding it in said slot and arranged to permit said strip to be moved down out of the slot, so as to permit a grip or trolley arm passing along in the slot to engage a cable or electric conductor supported in said conduit.

3. The combination, with the slotted conduit, of the flexible strip arranged to close the slot in said conduit, and the series of weighted arms engaging said strip and holding it in said slot and adapted to permit said strip to be depressed into the lower part of the conduit to allow the temporary admittance of a trolley or grip arm extending down through the slot and carrying means for engaging the cable or electric conductor arranged in said conduit, substantially as described.

4. The combination, with the slotted conduit, of the flexible strip adapted to close the slot in the conduit, vertically-yielding supports engaging said strip, a car, a cable or conductor arranged in said conduit, the wheel-roller arranged in said conduit and wholly beneath the upper surfaces thereof and adapted to pass along the upper edge of said flexible strip, and an arm extending from the car and carrying a trolley device or grip adapted to engage said conductor or cable in the conduit, substantially as described.

5. The combination, with the slotted conduit, of the flexible strip adapted to close the slot in the conduit, vertically-yielding supports for said strip, a car, and a roll or wheel arranged wholly within said conduit and carried by the car and engaging said strip for the purpose of pressing it down out of the slot as the car passes along the conduit to permit a grip or trolley arranged in connection with said roller to engage a cable or conductor provided in said conduit, substantially as described.

6. The combination, with the slotted conduit provided with tracks or rails arranged within said conduit upon opposite sides of the slot, of a yielding closing-strip arranged within said conduit and adapted to close its slot, a car provided with a bar or arm projecting into said conduit, and a truck secured to said bar and provided with wheels engaging said tracks, and a roll engaging said strip to hold it out of the slot as the truck passes along in the conduit, substantially as described.

7. The combination, with the slotted conduit, of the flexible closing-strip and the series of weighted arms having a pivoted connection with said strip.

8. The combination, with a conduit having a downwardly-flaring slot, of a flexible strip adapted to enter the same from below, a car, a trolley-arm carried thereby, a wheel or roll provided on said arm and adapted to engage said strip to press the same down, and a trolley or grip arm arranged in connection with the same and extending into the slot through the opening temporarily formed between the edges of the slot and the depressed flexible strip, substantially as described.

9. The combination, of the conduit having the slot arranged in its upper surface and of an inverted-V shape, with a V-shaped flexible metallic strip adapted to fit said slot and close the same, vertically-yielding supports for said strip, an electric conductor or cable arranged in said circuit, a car-track, a car adapted to move thereon, the trolley-arm extending therefrom down through said slot and carrying a trolley or grip arm within said conduit, and a roll or wheel arranged on said trolley-arm and wholly within said conduit, said roll with the arm adapted to press down said V-shaped strip to open the slot as the grip is advanced, thereby allowing said arm to move through the slot unobstructed, substantially as described.

10. The combination, with the conduit having the slot of the inverted-V shape, of a flexible metallic closing-strip adapted to fit within said slot, vertically-yielding supports for said flexible strip, and a yielding connection between said supports, whereby expansion and contraction of said strip may take place without displacement of said supports, substantially as described.

In testimony whereof I have hereunto set my hand this 21st day of January, 1891.

CLARENCE H. BATES.

In presence of—
A. C. PAUL,
O. G. HAWLEY.